United States Patent
Bonduelle et al.

(10) Patent No.: US 9,718,050 B2
(45) Date of Patent: Aug. 1, 2017

(54) CATALYST COMPRISING AT LEAST ONE ZEOLITE NU-86, AT LEAST ONE ZEOLITE USY AND A POROUS MINERAL MATRIX AND PROCESS FOR HYDROCONVERSION OF HYDROCARBON FEEDS USING SAID CATALYST

(71) Applicant: IFP ENERGIES NOUVELLES, Rueil-Malmaison (FR)

(72) Inventors: Audrey Bonduelle, Francheville (FR); Emmanuelle Guillon, Vourles (FR); Magalie Roy-Auberger, Nivolas-Vermelle (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 525 days.

(21) Appl. No.: 14/367,260

(22) PCT Filed: Nov. 23, 2012

(86) PCT No.: PCT/FR2012/000481
§ 371 (c)(1),
(2) Date: Jun. 20, 2014

(87) PCT Pub. No.: WO2013/093225
PCT Pub. Date: Jun. 27, 2013

(65) Prior Publication Data
US 2015/0231615 A1 Aug. 20, 2015

(30) Foreign Application Priority Data
Dec. 22, 2011 (FR) ..................... 11 04022

(51) Int. Cl.
*B01J 29/80* (2006.01)
*C10G 47/20* (2006.01)
*C10G 65/12* (2006.01)
*B01J 29/16* (2006.01)
*B01J 29/076* (2006.01)

(52) U.S. Cl.
CPC .............. *B01J 29/80* (2013.01); *C10G 47/20* (2013.01); *C10G 65/12* (2013.01); *B01J 29/076* (2013.01); *B01J 29/166* (2013.01)

(58) Field of Classification Search
CPC ........ B01J 29/076; B01J 29/166; B01J 29/80; C10G 47/20; C10G 65/12
See application file for complete search history.

(56) References Cited

U.S. PATENT DOCUMENTS

| 6,077,420 A | 6/2000 | Benazzi et al. |
| 7,381,321 B2 | 6/2008 | Benazzi et al. |
| 2004/0159581 A1 | 8/2004 | Benazzi et al. |
| 2011/0230691 A1* | 9/2011 | Bonduelle .............. B01J 23/002 585/266 |

FOREIGN PATENT DOCUMENTS

| FR | 2758567 A1 | 7/1998 |
| FR | 2836150 A1 | 8/2003 |

OTHER PUBLICATIONS

International Search Report dated Apr. 25, 2013 issued in corresponding PCT/FR2012/000481 application (pp. 1-2).

* cited by examiner

*Primary Examiner* — Renee Robinson
*Assistant Examiner* — Derek Mueller
(74) *Attorney, Agent, or Firm* — Millen, White, Zelano and Branigan, P.C.

(57) ABSTRACT

The invention relates to a catalyst comprising at least one metal selected from the group formed by metals of group VIB and of group VIII of the periodic table, used alone or as a mixture, and a support comprising at least one zeolite NU-86, at least one zeolite Y and at least one porous mineral matrix containing at least aluminum and/or at least silicon. The invention also relates to a process for hydrocracking of hydrocarbon feeds employing said catalyst.

13 Claims, No Drawings

CATALYST COMPRISING AT LEAST ONE ZEOLITE NU-86, AT LEAST ONE ZEOLITE USY AND A POROUS MINERAL MATRIX AND PROCESS FOR HYDROCONVERSION OF HYDROCARBON FEEDS USING SAID CATALYST

The hydrocracking of heavy petroleum cuts is a key process in refining, which makes it possible to produce, starting from surplus heavy feedstocks that are not easily marketable, lighter fractions such as gasolines, jet fuels and light gas oils that the refiner requires for adapting his output to the demand. Certain hydrocracking processes also make it possible to obtain a highly purified residue that can constitute excellent bases for oils.

The catalysts used in hydrocracking are all of the bifunctional type combining an acid function with a hydrogenating function. The acid function is supplied by supports with large surface areas (generally 150 to 800 $m^2 \cdot g^{-1}$) having high acidity, such as halogenated aluminas (notably chlorinated or fluorinated), combinations of oxides of boron and of aluminium, amorphous silica-aluminas and zeolites. The hydrogenating function is supplied either by one or more metals of group VIII of the periodic table, or by a combination of at least one group VIB metal of the periodic table and at least one group VIII metal, employed in the presence of sulphur.

The equilibrium between the two functions—acid and hydrogenating—determines the activity and selectivity of the catalyst. A weak acid function and a strong hydrogenating function give catalysts of low activity, generally operating at high temperature (greater than or equal to 390° C.), and at low space velocity of feed (LHSV expressed as volume of feed to be treated per unit volume of the catalyst and per hour is generally less than or equal to 2 $h^{-1}$) but endowed with very good selectivity for middle distillates. Conversely, a strong acid function and a weak hydrogenating function give catalysts that are active but with lower selectivities for middle distillates. The development of a catalyst that is active and selective is still a major goal in improvement of hydrocracking processes.

Depending on the operating conditions and the nature of the feeds to be converted, conventional catalysts for catalytic hydrocracking can consist of supports of low acidity. Supports that are moderately acidic include the family of silica-aluminas. Many commercial hydrocracking catalysts are based on silica-alumina combined either with a group VIII metal or, preferably when the content of heteroatomic poisons in the feed to be treated exceed 0.005 wt %, with a combination of sulphides of metals of groups VIB and VIII. These systems have very good selectivity for middle distillates, and the products formed are of good quality. These catalysts, for the less acid among them, can also produce lubricant bases. The drawback of all these catalytic systems based on an amorphous support is, as mentioned, their low activity.

As for the catalysts comprising zeolites, they have higher catalytic activity than the amorphous silica-aluminas, but often their selectivities for light products are not high.

The prior art lists numerous patent applications. We may mention, non-exhaustively, patents relating to the use of zeolites USY (Ultra-stable-Y) (U.S. Pat. No. 5,171,422) or of zeolite Beta (U.S. Pat. No. 6,524,470, U.S. Pat. No. 6,231,750).

Patent application FR 2 755 958 also describes the use of a catalyst comprising at least one matrix and zeolite NU-86 and at least one active phase in a process for the hydrocracking of hydrocarbon feeds.

Moreover, certain patents relate to the use of known composite catalysts combining a zeolite and a silica-alumina, for example U.S. Pat. No. 4,419,271 and U.S. Pat. No. 6,902,664. These combinations allow partial adjustment of the activity and/or selectivity of the hydrocracking catalysts.

The research work carried out by the applicant on numerous zeolites and microporous solids led him to discover that a catalyst composed of at least one zeolite NU-86, and of at least one zeolite Y and a porous mineral matrix containing at least aluminium or at least silicon make it possible to improve the conversion activity of conventional hydrocracking catalysts while increasing the yield of middle distillates.

More particularly, one object of the present invention relates to a catalyst comprising at least one metal selected from the group formed by metals of group VIB and of group VIII of the periodic table, used alone or as a mixture, and a support comprising at least one zeolite NU-86, at least one zeolite Y and at least one porous mineral matrix containing at least aluminium and/or at least silicon.

Another object of the present invention relates to a process for hydrocracking of hydrocarbon feeds using said catalyst.

One advantage of the present invention is that it provides a specific catalyst and a process for hydroconversion of hydrocarbon feeds using said catalyst making it possible to increase the yields of middle distillates.

Detailed Description of the Catalyst

The catalyst according to the present invention comprises and preferably consists of at least one hydrogenating-dehydrogenating metal selected from the group formed by metals of group VIB and of group VIII of the periodic table, used alone or as a mixture, and a support comprising at least one zeolite NU-86, at least one zeolite Y and at least one porous mineral matrix comprising at least aluminium and/or at least silicon.

According to the invention, the support of said catalyst comprises and preferably consists of at least one zeolite NU-86, at least one zeolite Y and at least one porous mineral matrix containing at least aluminium or at least silicon.

Zeolite NU-86

Zeolite NU-86 in the hydrogen form, denoted by H—NU-86 and obtained by calcining and/or ion exchange of crude synthetic zeolite NU-86 together with the method of preparation thereof is described in patent EP-0463768 A2. Said zeolite NU-86 is characterized by X-ray diffraction structural data defined by Casci et al. in patent application EP463,768.

Zeolite NU-86 is generally synthesized in the presence of sodium cations and an organic structure-forming agent which is either octamethonium dibromide or nonamethonium dibromide.

Zeolite NU-86 contains silicon and at least one element T selected from the group comprising aluminium, iron, gallium, boron, germanium; T is preferably aluminium.

Zeolite NU-86 does not have a defined structural type, according to the rules of the IZA (International Zeolite Association).

The structural type of this zeolite has not yet been officially attributed by the synthesis committee of the IZA (International Zeolite Association). However, following the works published at the 9th International Zeolite Conference by J. L. Casci, P. A. Box and M. D. Shannon ("Proceedings of the 9th International Zeolite Conference, Montreal 1992, Eds R. Von Ballmoos et al., 1993 by Butterworth) it appears that, according to its properties:

zeolite NU-86 has a three-dimensional microporous system;

this three-dimensional microporous system consists of straight channels with the pore opening delimited by 11 atoms T (tetrahedral atoms: Si, Al, Ga, Fe etc.), of straight channels delimited alternately by openings with 10 and 12 atoms T and sinusoidal channels also delimited alternately by openings with 10 and 12 atoms T.

The term pore opening with 10, 11 or 12 tetrahedral atoms (T) means pores consisting of 10, 11 or 12 oxygen atoms.

The zeolite NU-86 comprised in the catalyst according to the invention is at least partly, preferably almost completely, in the acid form, i.e. in the hydrogen form ($H^+$), the sodium content preferably being such that the atomic ratio Na/T is below 10%, preferably below 5%, even more preferably below 1%.

The zeolite NU-86 used according to the invention has a molar ratio Si/T below 150, preferably below 100, preferably below 50, very preferably below 35, more preferably below 20, and even more preferably below 15.

The Si/Al ratio can be obtained during synthesis, without subsequent modifying treatment. It can also be obtained by techniques of dealuminization known by a person skilled in the art such as for example a steam treatment, i.e. thermal treatment under steam and/or acid treatment. Patent application EP 0,939,673 describes methods of carrying out the dealuminization of zeolite NU-86.

Preferably, the NU-86 used in the invention does not undergo a dealuminization step, before being formed within the support of the catalyst according to the present invention.

Zeolite Y

Zeolite Y is of the structural type FAU defined according to the rules of the IZA. The zeolites Y generally used in hydrocracking catalysts are manufactured by modifying commercially available zeolites Na—Y. This modification can lead to known stabilized, ultra-stabilized or dealuminized, desilicated zeolites. This modification can be carried out by at least one of the dealuminization techniques, and for example by hydrothermal treatment, by an acid etching treatment or by a treatment of desilication (basic treatment). The zeolites are prepared according to the techniques generally used for dealuminization. The successive treatment or treatments for modifying the zeolites Y have the objective of adapting the acidity and the mesoporosity of the zeolite. Examples of types of modification of zeolites are described in the book by C. Marcilly, Catalyse acido-basique [Acid-base catalysis], published by Technip 2003.

The acid etching operation consists for example of bringing the zeolite in contact with an aqueous solution of a mineral acid. The severity of the acid etching is adjusted by the concentration of acid, the time and the temperature. When carried out on a hydrothermally treated zeolite, this treatment has the effect of removing the aluminic species extracted from the framework, which clog the microporosity of the solid.

The characteristics of the zeolite Y used in the invention are advantageously:

an overall atomic ratio Si/Al between about 2.5 and 100 and preferably between about 2.5 and 80, even more preferably between 3 and 50 and even more preferably between 5 and 25, a sodium content below 0.15 wt % determined on the zeolite calcined at 1100° C., a unit cell dimension between 24.58 Å and 24.20 Å and preferably between 24.38 Å and 24.24 Å, a specific surface determined by the BET method greater than about 300 $m^2/g$ and preferably greater than 400 $m^2/g$, preferably greater than 500 $m^2/g$ and more preferably greater than 700 $m^2/g$.

an initial mesopore volume measured by nitrogen porosimetry greater than 0.05 $ml \cdot g^{-1}$, preferably greater than 0.07 $ml \cdot g^{-1}$, and preferably greater than 0.10 $ml \cdot g^{-1}$ and even more preferably greater than 0.13 $ml \cdot g^{-1}$.

Moreover, the zeolite Y used according to the invention is preferably partially amorphous and is prepared according to the techniques generally used for dealuminization or desilication, from commercially available zeolites Y. Preferably, the zeolite comprised in the support of the catalyst according to the invention is a dealuminized zeolite called USY.

The dealuminized zeolite USY used according to the invention can optionally and preferably have an initial extra-lattice aluminium atom fraction by weight greater than 5%, preferably greater than 10%, preferably greater than 15%, and even more preferably greater than 20 wt % relative to the total weight of aluminium present in the zeolite.

Said zeolite Y included in the composition of the catalyst according to the invention is advantageously calcined and exchanged by at least one treatment with a solution of at least one ammonium salt so as to obtain the ammonium form of the zeolites which, once calcined, lead to the hydrogen form of said zeolites. This treatment can be carried out before the modification of the zeolites (dealuminization, steaming, desilication, etc.) or else after modification of said zeolites.

Said zeolite Y used according to the invention is at least partly, preferably almost completely, in the acid form, i.e. in the hydrogen form ($H^+$). The atomic ratio Na/T is generally below 10% and preferably below 5% and even more preferably below 1%.

A preferred zeolite Y used according to the invention is a zeolite Y that has undergone a special hydrothermal treatment such as described in U.S. Pat. No. 5,601,798. Said treatment has the effect of increasing the mesoporosity of zeolites Y, USY, VUSY and SDUSY, zeolites which are particularly interesting in combination with zeolite Y and the porous mineral matrix comprising at least aluminium and/or at least silicon described above.

The Porous Mineral Matrix

According to the invention, the porous mineral matrix included in the composition of the support of the catalyst according to the invention comprises at least aluminium and/or at least silicon.

Preferably, said matrix comprises at least one aluminium oxide or at least one silicon oxide. Said matrix can advantageously be acidic or not. Said matrix can advantageously be mesostructured or not.

Said porous mineral matrix can advantageously be selected from transition aluminas, doped aluminas, preferably with phosphorus, with boron and/or with fluorine, silicalite and silicas, aluminosilicates, preferably amorphous or poorly crystallized, non-zeolitic crystalline molecular sieves such as silicoaluminophosphates, aluminophosphates, ferrosilicates, titanium silicoaluminates, borosilicates, chromosilicates and alum inophosphates of transition metals, alone or as a mixture.

In the case where said porous mineral matrix is selected from transition aluminas, silicalite and silicas, for example mesoporous silicas, said matrix is not acidic. Transition alumina means for example an α-alumina, a δ-alumina, a γ-alumina or a mixture of aluminas of these different phases.

In the case where said porous mineral matrix is selected from aluminosilicates, preferably amorphous or poorly crystallized, non-zeolitic crystalline molecular sieves such as silicoaluminophosphates, aluminophosphates, ferrosilicates, titanium silicoaluminates, borosilicates, chromosilicates and aluminophosphates of transition metals, doped aluminas, preferably with phosphorus, with boron and/or with fluorine, said matrix is acidic. Any silica-alumina known by a person skilled in the art or any aluminosilicate known by a person skilled in the art is suitable for the invention.

The acidic porous mineral matrix can also advantageously contain, in addition to at least one of the oxide compounds mentioned above, at least one synthetic or natural simple clay of the dioctahedral 2:1 phyllosilicate or trioctahedral 3:1 phyllosilicate type such as kaolinite, antigorite, chrysotile, montmorillonite, beidellite, vermiculite, talc, hectorite, saponite, laponite. These clays can optionally be delaminated.

Said porous mineral matrix preferably has a content of cationic impurities below 0.1 wt %, preferably below 0.05 wt % and even more preferably below 0.025 wt %. Content of cationic impurities means the total content of alkaline substances. The matrix preferably has a content of anionic impurities below 1 wt %, preferably below 0.5 wt % and even more preferably below 0.1 wt %.

In the case where said porous mineral matrix comprises at least silicon, the content by weight of $SiO_2$ in said porous mineral matrix is advantageously between 1 and 99 wt %, preferably between 5 and 95 wt %, preferably between 10 and 90 wt %, more preferably between 10 and 50 wt %, and even more preferably between 20 and 50 wt %.

Preferably, said porous mineral matrix is selected from alumina and silica-alumina.

The support of the catalyst according to the invention advantageously has a pore volume between 0.1 and 1.2 ml/g and preferably between 0.2 and 1 ml/g. The specific surface of said support is advantageously between 50 and 1000 $m^2/g$ and preferably between 100 and 600 $m^2/g$. Said support is formed in such a way that it is advantageously in the form of beads, extrudates, pellets, or irregular and non-spherical agglomerates, the specific shape of which can result from a step of crushing. Very advantageously, said support is in the form of beads or extrudates.

The Hydrogenating Function

The catalyst according to the invention further comprises at least one hydrogenating-dehydrogenating metal selected from the group formed by metals of group VIB and of group VIII of the periodic table, used alone or as a mixture.

The metals of group VIB and of group VIII can be present at least partly in a form selected from metallic and/or oxide and/or sulphide form.

The group VIII metals are advantageously selected from noble metals or base metals, preferably from iron, cobalt, nickel, ruthenium, rhodium, palladium, osmium, iridium and platinum, alone or as a mixture and preferably said group VIII metals are selected from nickel, cobalt and iron, platinum and palladium used alone or as a mixture.

The group VIII base metals are preferably selected from nickel, cobalt and iron.

The noble group VIII metals are preferably selected from platinum and palladium used alone or as a mixture.

The group VIB metals are preferably selected from tungsten and molybdenum used alone or as a mixture.

Advantageously, the following combinations of metals are used: nickel-molybdenum, cobalt-molybdenum, nickel-tungsten, cobalt-tungsten, and the preferred combinations are: nickel-molybdenum, cobalt-molybdenum, cobalt-tungsten, nickel-tungsten and even more advantageously nickel-molybdenum and nickel-tungsten.

Preferably, said catalyst comprises at least one hydrogenating-dehydrogenating metal of group VIB in combination with at least one group VIII base metal.

In the case where the catalyst comprises at least one group VIB metal in combination with at least one group VIII base metal, the content of group VIB metal is, in oxide equivalent, advantageously between 5 and 40 wt % relative to the total weight of said catalyst, preferably between 10 and 35 wt % and very preferably between 15 and 30 wt % and the content of group VIII base metal is, in oxide equivalent, advantageously between 0.5 and 10 wt % relative to the total weight of said catalyst, preferably between 1 and 8 wt % and very preferably between 1.5 and 6 wt %.

In the case where the catalyst comprises at least one group VIII noble metal, the content of group VIII base metal is, in oxide equivalent, advantageously between 0.05 and 5 wt % relative to the total weight of said catalyst, preferably between 0.1 and 2 wt % and very preferably between 0.1 and 1 wt %.

The catalyst according to the invention can also optionally comprise at least one group VIIA element, preferably selected from chlorine and fluorine, alone or as a mixture.

Preferably, said catalyst optionally comprises a content of group VIIA element between 0 and 10%, preferably between 0.1 to 8% and more preferably between 0.1 to 5 wt % of metallic element relative to the total weight of said catalyst.

The catalyst according to the present invention can also optionally comprise promoters of the active phase, preferably selected from doping elements and organic compounds. Said entities can advantageously be added at various steps in the preparation of the catalyst according to the invention.

The Doping Elements

The catalyst according to the present invention can also optionally comprise at least one doping element selected from boron, silicon and phosphorus, alone or as a mixture. Doping element means an element that is added, which in itself does not have any catalytic character but which increases the catalytic activity of the catalyst.

Said catalyst optionally comprises a content of doping element between 0 and 10%, preferably between 0.5 to 8% and more preferably between 0.5 to 6 wt % of oxide relative to the total weight of said catalyst. The content of silicon doping element is not taken into account in the total silicon content in the zeolite or in the matrix.

Said doping element can advantageously be introduced, alone or as a mixture, during synthesis of said support used in the invention. It can also be introduced by impregnation of the support after forming, before or after drying, before or after calcining.

The boron, the silicon and/or the phosphorus can be in the porous mineral matrix, or in the zeolites or are preferably deposited on the catalyst and then principally localized on said porous mineral matrix. The doping element introduced, and in particular silicon, principally localized on said matrix of the support can be characterized by techniques such as the Castaing microprobe (distribution profile of the various elements), transmission electron microscopy coupled to X-ray analysis of the components of the catalyst, or alternatively by mapping the distribution of the elements present in the catalyst by electron microprobe.

The Organic Additives

The catalyst according to the present invention can also optionally comprise at least one organic additive. Organic additive means an organic molecule, which in itself does not have any catalytic character but which increases the catalytic activity of the catalyst.

The organic compounds used as elements promoting the hydrogenating function are preferably selected from chelating agents, non-chelating agents, reducing agents and the additives known by a person skilled in the art. Said organic compounds are advantageously selected from mono-, di- or polyols optionally etherified, carboxylic acids, sugars, noncyclic mono-, di- or polysaccharides such as glucose, fructose, maltose, lactose or sucrose, esters, ethers, crown ethers, cyclodextrins and compounds containing sulphur or nitrogen such as nitriloacetic acid, ethylenediaminetetraacetic acid, or diethylenetriamine, alone or as a mixture.

Said catalyst optionally comprises a content of organic additive between 0 and 30%, preferably between 5 and 30% and more preferably between 10 and 30 wt % relative to the total weight of said catalyst.

The Catalyst

The catalyst according to the present invention advantageously comprises in wt % relative to the total weight of the catalyst:
- 0.2 to 10 wt %, preferably from 0.2 to 8 wt %, preferably from 0.5 to 5 wt %, of at least one zeolite NU-86,
- 0.4 to 40 wt %, preferably from 0.5 to 30 wt %, preferably from 1 to 20 wt % of at least one zeolite Y,
- from 0.5 to 50 wt %, preferably from 0.5 to 40 wt %, and even more preferably from 0.5 to 30 wt % of at least one hydrogenating-dehydrogenating metal selected from the group formed by metals of group VIB and of group VIII,
- 1 to 99 wt % and preferably 2 to 98 wt %, preferably from 5 to 95 wt % of at least one porous mineral matrix comprising at least aluminium and/or at least silicon.

Said catalyst optionally comprises:
- from 0 to 10 wt %, preferably from 0.5 to 8 wt % and even more preferably from 0.5 to 6 wt % of oxide, of at least one doping element selected from silicon introduced as doping element, boron and phosphorus, and preferably boron and/or silicon. The content of silicon doping element is not taken into account in the total silicon content in the zeolite or in the matrix.
- 0 to 10 wt %, preferably from 0.1 to 8 wt % and even more preferably from 0.1 to 5 wt % of at least one element selected from group VIIA, preferably fluorine, the percentage being expressed in percentage by weight of the metallic element.
- from 0 to 30 wt % and preferably from 10 to 30 wt % of at least one organic additive as described above.

Forming of the Supports and/or Catalysts

The support can be formed by any technique known by a person skilled in the art. The forming can be carried out for example by extrusion, by pelletizing, by the method of drop coagulation ("oil-drop"), by rotating plate granulation or by any other method well known by a person skilled in the art.

Forming can also be carried out in the presence of the various constituents of the catalyst and extrusion of the mineral paste obtained, by pelletizing, forming as beads in a bowl granulator or drum granulator, drop coagulation, "oil-drop", "oil-up", or any other method known for agglomeration of a powder containing alumina and optionally other ingredients selected from those mentioned above. Forming can be carried out by all the methods that are well known by a person skilled in the art. Advantageously, it is obtained by mixing the zeolites and at least one porous mineral matrix and then the mixture is formed. The hydrogenating element or elements are introduced during mixing, or preferably after forming. Forming is followed by calcining, the hydrogenating element or elements are introduced before or after said calcining, preferably after.

One of the preferred methods according to the present invention consists of mixing the powders of zeolites NU-86+Y in a wet gel for some tens of minutes, and then passing the resultant paste through a die to form extrudates with a diameter between 0.4 and 4 mm.

Moreover, these supports employed according to the present invention can have been treated as is well known by a person skilled in the art with additives to facilitate the forming operation and/or improve the final mechanical properties of the supports. As examples of additives, we may notably mention cellulose, carboxymethylcellulose, carboxyethylcellulose, tall oil, xanthan gums, surfactants, flocculating agents such as polyacrylamides, carbon black, starches, stearic acid, polyacrylic alcohol, polyvinyl alcohol, biopolymers, glucose, polyethylene glycols, etc.

Control of the characteristic porosity of the supports of the invention is partly achieved during this step of forming of the particles of the supports.

The tamped packing density of the supports, after calcining, is advantageously above 0.5 $g/cm^3$ and preferably above 0.6 $g/cm^3$.

Thermal Treatments of the Support

The formed support is then advantageously submitted to one or more thermal treatments.

Said support advantageously undergoes a drying step. Said drying step is carried out by any technique known by a person skilled in the art. Preferably, drying is carried out under an air stream. Said drying can also advantageously be carried out under a stream of any oxidizing, reducing or inert gas. Drying is advantageously carried out at reduced pressure. Preferably, drying is advantageously carried out between 50 and 180° C., preferably between 60 and 150° C. and very preferably between 80 and 130° C.

Said support, optionally dried, then preferably undergoes a calcining step.

Said calcining step is advantageously carried out in the presence of molecular oxygen, for example by flushing with air, at a temperature less than or equal to 1100° C. At least one calcining step can advantageously be carried out after any one of the preparation steps. Said calcining step can advantageously be carried out in a traversed bed, in a swept bed or in a static atmosphere. For example, the furnace used can be a rotary kiln or can be a vertical furnace with radial traversed layers. Calcining conditions: temperature and time depend principally on the maximum service temperature of the catalyst. Preferably, said calcining step is carried out for between more than one hour at 200° C. to less than one hour at 1100° C. Calcining can advantageously be carried out in the presence of steam. The final calcining can optionally be carried out in the presence of an acidic or basic vapour. For example, calcining can be performed under ammonia partial pressure.

Post-Synthesis Treatments of the Support

Post-synthesis treatments can be carried out in order to improve the properties of the support.

Said support can thus optionally be submitted to a hydrothermal treatment in a confined atmosphere or under a stream of steam. Hydrothermal treatment in a confined atmosphere means a treatment in an autoclave in the presence of water at a temperature above room temperature.

In the case when said hydrothermal treatment is carried out in a confined atmosphere, said support comprising the porous mineral matrix and zeolites Y and NU-86, after forming, can be treated in various ways. Thus, said support can advantageously be impregnated with acid, prior to transfer to the autoclave, the autoclaving being performed either in the vapour phase, or in the liquid phase, and this vapour phase or liquid phase of the autoclave can be acidic or not. This impregnation, prior to autoclaving, can be acidic or not. This impregnation prior to autoclaving can be carried out dry or by immersion of said support in an acidic aqueous solution. Preferably, impregnation is carried out dry.

The autoclave is preferably a rotating basket autoclave such as that defined in patent application EP-A-0 387 109.

The temperature during autoclaving is advantageously between 100 and 250° C. for a period of time between 30 minutes and 3 hours.

Preparation of the Catalyst

The hydrogenating function can be introduced only partly (for example in the case of combinations of oxides of metals of groups VIB and VIII) or completely at the time of mixing of the zeolite with the oxide gel selected as the matrix. A proportion of the metals can be deposited on the mixture of zeolites prior to forming.

The hydrogenating function can be introduced by one or more operations of ion exchange on the calcined support consisting of a zeolite as described above, dispersed in the matrix selected, by means of solutions containing the precursor salts of the metals selected.

The hydrogenating function can be introduced by one or more operations of impregnation of the formed and calcined support, with a solution containing at least one precursor of at least one oxide of at least one metal selected from the group formed by the group VIII metals and the group VIB metals, the precursor(s) of at least one oxide of at least one group VIII metal preferably being introduced after those of group VIB or at the same time as the latter, if the catalyst contains at least one group VIB metal and at least one group VIII metal.

In the case where the catalyst contains at least one element of group VIB, for example molybdenum, it is for example possible to impregnate the catalyst with a solution containing at least one element of group VIB, and then dry and calcine. It is possible to select impregnation of molybdenum precursors or of tungsten precursors that contain phosphorus, such as polyoxometallates of the Keggin or Strandberg type, which also allows phosphorus to be introduced so as to promote the catalytic activity. The matrix is preferably impregnated by the known "dry" method of impregnation that is familiar to a person skilled in the art. Impregnation can be carried out in a single step with a solution containing all of the elements constituting the final catalyst or in several steps using several successive impregnation operations with intermediate drying steps between them, with solutions containing one or more metals.

Phosphorus, boron, silicon as doping element and the element selected from the halide ions of group VIIA can be introduced in one or more operations of impregnation with excess of solution on the calcined precursor.

In the case where the catalyst contains boron, a preferred method according to the invention consists of preparing an aqueous solution of at least one boron salt such as ammonium diborate or pentaborate in alkaline medium and in the presence of hydrogen peroxide and carrying out a known dry impregnation, in which the volume of the pores of the precursor is filled with the solution containing boron.

In the case where the catalyst contains silicon, a solution of a silicon compound of the silicone type will be used.

In the case where the catalyst contains boron and silicon, the boron and the silicon can also be deposited simultaneously using a solution containing a boron salt and a silicon compound of the silicone type. Thus, for example, in the case where the precursor is a catalyst of the nickel-molybdenum type supported on a support containing zeolite and alumina, it is possible to impregnate this precursor with an aqueous solution of ammonium diborate and Rhodorsil E1P silicone from the company RhOne Poulenc, carry out drying for example at 80° C., then impregnation with a solution of ammonium fluoride, carry out drying for example at 80° C., and then carry out calcining for example and preferably in air in a traversed bed, for example at 500° C. for 4 hours.

In the case where the catalyst contains at least one group VIIA element, preferably fluorine, it is for example possible to impregnate the catalyst with a solution of ammonium fluoride, carry out drying for example at 80° C., and then carry out calcining for example and preferably in air in a traversed bed, for example at 500° C. for 4 hours.

Other impregnation sequences can be employed for obtaining the catalyst of the present invention.

In the case where the catalyst contains phosphorus, it is for example possible to impregnate the catalyst with a solution containing phosphorus, followed by drying and calcining.

In the case where the elements contained in the catalyst, i.e. at least one metal selected from the group formed by metals of group VIII and of group VIB, optionally boron, silicon, phosphorus, at least one group VIIA element, and at least one group VIIB element, are introduced in several operations of impregnation of the corresponding precursor salts, a step of intermediate drying of the catalyst is generally carried out at a temperature generally between 60 and 250° C. and a step of intermediate calcining of the catalyst is generally carried out at a temperature between 250 and 600° C. In the case where the catalyst contains an organic additive, said organic additive can advantageously be introduced, alone or as a mixture, after forming and calcining of the support. Said organic additive can be introduced by impregnation before impregnation of the metallic precursors, in co-impregnation with the metallic precursors or in post-impregnation after impregnation of the metallic precursors and optionally drying of the catalysts thus formed.

For terminating preparation of the catalyst, the moist solid is left under a humid atmosphere at a temperature advantageously between 10 and 80° C. Said moist solid obtained is advantageously dried at a temperature between 60 and 150° C. Then the solid obtained is optionally calcined at a temperature advantageously between 150 and 800° C.

The sources of elements of group VIII that can be used are well known by a person skilled in the art. The precursors of the group VIII base metal(s) is/are advantageously selected from oxides, hydroxides, hydroxycarbonates, carbonates and nitrates. Nickel hydroxycarbonate, nickel nitrate, cobalt nitrate, nickel carbonate or nickel hydroxide, cobalt carbonate or cobalt hydroxide are preferably used.

The precursors of the group VIII noble metal(s) is/are advantageously selected from halides, for example chlorides, nitrates, acids such as chloroplatinic acid, oxychlorides such as ammoniated ruthenium oxychloride.

The sources of group VIB elements that can be used are well known by a person skilled in the art. For example, among the sources of molybdenum, it is possible to use oxides and hydroxides, molybdic acids and salts thereof in particular ammonium salts such as ammonium molybdate, ammonium heptamolybdate, phosphomolybdic acid ($H_3PMo_{12}O_{40}$) and salts thereof, and optionally silicomolybdic acid ($H_4SiMo_{12}O_{40}$) and the corresponding salts. The sources of molybdenum can also be any polyoxometallate of the Keggin, lacunar Keggin, substituted Keggin, Dawson, Anderson, Strandberg, type, for example. Molybdenum trioxide and heteropolyanions of the Strandberg ($P_2Mo_5O_{23}^{6-}$), Keggin ($PMo_{12}O_{40}^{3-}$), lacunar Keggin or substituted Keggin type, known by a person skilled in the art, are preferably used.

For example, among the sources of tungsten, it is possible to use oxides and hydroxides, tungstic acids and salts thereof in particular ammonium salts such as ammonium tungstate, ammonium metatungstate, phosphotungstic acid ($H_3PW_{12}O_{40}$) and salts thereof, and optionally silicotungstic acid ($H_4SiW_{12}O_{40}$) and salts thereof. The sources of tungsten can also be any polyoxometallate of the Keggin, lacunar Keggin, substituted Keggin, or Dawson type, for example. Oxides and ammonium salts such as ammonium metatungstate or heteropolyanions of the Keggin, lacunar Keggin or substituted Keggin type, known by a person skilled in the art, are preferably used.

The source of phosphorus can advantageously be orthophosphoric acid $H_3PO_4$, the corresponding salts and esters or ammonium phosphates. Phosphorus can also advantageously be introduced at the same time as the group VIB element(s) in the form of heteropolyanions of the Keggin, lacunar Keggin, substituted Keggin type or of the Strandberg type such as for example in the form of phosphomolybdic acid and salts thereof, phosphotungstic acid and salts thereof, during synthesis of said matrix. Phosphorus, when it is not introduced during synthesis of said matrix but by post-impregnation, can advantageously be introduced in the form of a mixture of phosphoric acid and of a basic organic compound containing nitrogen such as ammonia, primary and secondary amines, cyclic amines, compounds of the pyridine family and quinolines and compounds of the pyrrole family.

Numerous sources of silicon can be used. Thus, it is possible to use ethyl orthosilicate $Si(OEt)_4$, siloxanes, polysiloxanes, silicates of halides such as ammonium fluorosilicate $(NH_4)_2SiF_6$ or sodium fluorosilicate $Na_2SiF_6$. Silicomolybdic acid and salts thereof, silicotungstic acid and salts thereof can also advantageously be used. Silicon can be added for example by impregnation of ethyl silicate in solution in a water/alcohol mixture. Silicon can be added for example by impregnation of a silicon compound of the silicone type in an aqueous suspension.

The source of boron can advantageously be boric acid, preferably orthoboric acid $H_3BO_3$, ammonium diborate or pentaborate, boron oxide, boric esters. Boron can also be introduced at the same time as the group VIB element(s) in the form of heteropolyanions of Keggin, lacunar Keggin, substituted Keggin for example in the form of boromolybdic acid and salts thereof, or borotungstic acid and salts thereof, during synthesis of said matrix. Boron, when it is not introduced during synthesis of said matrix but by post-impregnation, can advantageously be introduced for example with a solution of boric acid in a water/alcohol mixture or in a water/ethanolamine mixture. Boron can also advantageously be introduced in the form of a mixture of boric acid, hydrogen peroxide and a basic organic compound containing nitrogen such as ammonia, primary and secondary amines, cyclic amines, compounds of the pyridine family and quinolines and compounds of the pyrrole family.

The sources of group VIIA elements that can be used are well known by a person skilled in the art. For example, fluoride anions can be introduced in the form of hydrofluoric acid or salts thereof. These salts are formed with alkali metals, ammonium or an organic compound. In the last-mentioned case, the salt is advantageously formed in the reaction mixture by reaction between the organic compound and hydrofluoric acid. It is also possible to use hydrolysable compounds that can release fluoride anions in water, such as ammonium fluorosilicate $(NH_4)_2SiF_6$, silicon tetrafluoride $SiF_4$ or sodium silicofluoride $Na_2SiF_6$. Fluorine can be introduced for example by impregnation with an aqueous solution of hydrofluoric acid or of ammonium fluoride.

The organic compounds used as elements promoting the hydrogenating function are preferably selected from chelating agents, non-chelating agents, reducing agents and the additives known by a person skilled in the art. Said organic compounds are advantageously selected from mono-, di- or polyols optionally etherified, carboxylic acids, sugars, non-cyclic mono-, di- or polysaccharides such as glucose, fructose, maltose, lactose or sucrose, esters, ethers, crown ethers, cyclodextrins and compounds containing sulphur or nitrogen such as nitriloacetic acid, ethylenediaminetetraacetic acid, or diethylenetriamine, alone or as a mixture.

The catalysts thus obtained, in the form of oxide, can optionally be transformed at least partly in metallic or sulphide form.

The catalysts obtained by the present invention are formed in the form of particles of various shapes and dimensions. They are generally used in the form of cylindrical or multilobed extrudates such as bilobed, trilobed, multilobed of straight or twisted shape, but can optionally be manufactured and used in the form of crushed powder, pellets, rings, beads, wheels. They have a specific surface measured by adsorption of nitrogen according to the BET method (Brown, Emmett, Teller, J. Am. Chem. Soc., Vol. 60, 309-316 (1938)) between 50 and 600 $m^2/g$, a pore volume measured by mercury porosimetry between 0.2 and 1.5 $cm^3/g$ and a pore size distribution that can be monomodal, bimodal or polymodal.

Preferably, the catalysts according to the invention are in the form of spheres or extrudates. It is however advantageous that the catalyst is in the form of extrudates with a diameter between 0.5 and 5 mm and more particularly between 0.7 and 2.5 mm. The shapes are cylindrical (which can be hollow or solid), twisted cylindrical, multilobed (2, 3, 4 or 5 lobes for example), or rings. The trilobed shape is preferably used, but any other shape can be used.

The tamped packing density of the catalysts is greater than 0.65 $g/cm^3$ and preferably greater than 0.75 $g/cm^3$.

Forming can be performed using techniques for the forming of catalysts that are known by a person skilled in the art, such as for example: extrusion, bowl granulation, spray-drying or pelletizing.

Water can be added or removed to adjust the viscosity of the paste to be extruded. This step can be carried out at any stage of the mixing step.

To adjust the solids content of the paste to be extruded in order to make it extrudable, a compound that is predominantly solid can also be added, preferably an oxide or a hydrate. Preferably a hydrate will be used, and even more preferably an aluminium hydrate. The loss on ignition of this hydrate will be greater than 15%.

The content of acid added during mixing before forming is less than 30 wt %, preferably between 0.5 and 20 wt % of the dry weight of silica or of alumina used in synthesis.

Extrusion can be carried out using any conventional tool that is commercially available. The paste resulting from mixing is extruded through a die, for example by means of a piston or a single-screw or twin-screw extruder. This extrusion step can be performed by any method known by a person skilled in the art.

The catalysts thus obtained are used for conversion of hydrocarbon feeds and in particular by hydrocracking.

Hydrocracking Process

The present invention also relates to a process for hydrocracking of hydrocarbon feeds employing the catalyst according to the present invention, said method being carried out, in the presence of hydrogen, at a temperature above 200° C., at a pressure above 1 MPa, at a space velocity between 0.1 and 20 h−1 and with an amount of hydrogen introduced such that the volume ratio liter of hydrogen/liter of hydrocarbon is between 80 and 5000 L/L.

Preferably, the hydrocracking process according to the invention operates at a temperature between 250 and 480° C., preferably between 320 and 450° C., very preferably between 330 and 435° C., at a pressure between 2 and 25 MPa, preferably between 3 and 20 MPa, at a space velocity between 0.1 and 6 h−1, preferably between 0.2 and 3 h−1, and with an amount of hydrogen introduced such that the volume ratio liter of hydrogen/liter of hydrocarbon is between 100 and 2000 L/L.

These operating conditions used in the process according to the invention generally make it possible to achieve conversions per pass, to products having boiling points below 340° C., and preferably below 370° C., greater than 15 wt % and even more preferably between 20 and 95 wt %.

Very varied feedstocks can be treated in the process according to the invention. They advantageously contain at least 20 vol % and preferably at least 80 vol % of compounds boiling above 340° C.

The hydrocarbon feed used in the process according to the present invention is advantageously selected from LCO (Light Cycle Oil=light gas oils from a catalytic cracking unit), atmospheric distillates, vacuum distillates such as for example gas oils from direct distillation of crude or from conversion units such as FCC, coking plant or visbreaking units, feeds from units for extraction of aromatics of lubricant oil bases or from solvent dewaxing of lubricant oil bases, distillates from fixed bed or ebullating bed processes of desulphurization or hydroconversion of atmospheric residues and/or of vacuum residues and/or of deasphalted oils, paraffins from the Fischer-Tropsch process and deasphalted oils, used alone or as a mixture. The above list is not exhaustive. Said feeds preferably have a boiling point T5 above 340° C., preferably above 370° C., i.e. 95% of the compounds present in the feed have a boiling point above 340° C., and preferably above 370° C.

The nitrogen content in the feeds treated in the processes according to the invention is advantageously above 500 ppm by weight, preferably between 500 and 10000 ppm by weight, more preferably between 700 and 4000 ppm by weight and even more preferably between 1000 and 4000 ppm by weight. The sulphur content of the feeds treated in the processes according to the invention is advantageously between 0.01 and 5 wt %, preferably between 0.2 and 4 wt % and even more preferably between 0.5 and 3 wt %.

The feed can optionally contain metals. The cumulative content of nickel and vanadium in the feeds treated in the processes according to the invention is preferably below 1 ppm by weight.

The feed can optionally contain asphaltenes. The asphaltenes content is generally below 3000 ppm by weight, preferably below 1000 ppm by weight, even more preferably below 200 ppm by weight.

Optionally said hydrocarbon feed can advantageously contain metals, in particular nickel and vanadium. The cumulative content of nickel and vanadium in said hydrocarbon feed, treated by the hydrocracking process according to the invention, is preferably below 1 ppm by weight. The asphaltenes content of said hydrocarbon feed is generally below 3000 ppm, preferably below 1000 ppm, even more preferably below 200 ppm.

Sulphurization of the Catalysts

Prior to injection of the feed and in the case where said catalysts comprise base metals, the catalysts used in the process according to the present invention are submitted to a sulphurization treatment for transforming, at least partially, the metallic species to sulphide before they are brought in contact with the feed to be treated. This treatment of activation by sulphurization is well known by a person skilled in the art and can be carried out by any method already described in the literature, either in situ, i.e. in the reactor, or ex situ.

A classical method of sulphurization well known by a person skilled in the art consists of heating the catalyst in the presence of hydrogen sulphide (pure or for example under a stream of a hydrogen/hydrogen sulphide mixture) at a temperature between 150 and 800° C., preferably between 250 and 600° C., generally in a traversed bed reaction zone.

Guard Beds

In the case where the feed contains compounds such as resins and/or asphaltenes, it is advantageous to pass the feed first over a bed of catalyst or of adsorbent different from the hydrocracking or hydrotreating catalyst. The catalysts or guard beds used according to the invention are in the form of spheres or extrudates. It is however advantageous for the catalyst to be in the form of extrudates with a diameter between 0.5 and 5 mm and more particularly between 0.7 and 2.5 mm. The shapes are cylindrical (which can be hollow or solid), twisted cylindrical, multilobed (2, 3, 4 or 5 lobes for example), or rings. The cylindrical shape is preferably used, but any other shape can be used.

In order to remedy the presence of contaminants and/or of poisons in the feed, the guard catalysts can, in another preferred embodiment, have more particular geometric shapes in order to increase their voidage. The voidage of these catalysts is between 0.2 and 0.75. Their outside diameter can vary between 1 and 35 mm. Among the particular shapes that are possible, without this list being exhaustive, we may mention: hollow cylinders, hollow rings, Raschig rings, jagged hollow cylinders, ribbed hollow cylinders, pentaring cartwheels, cylinders with multiple holes, etc.

These guard catalysts or guard beds may have been impregnated by an active phase or not. Preferably, catalysts are impregnated by a hydrogenating-dehydrogenating phase. Very preferably, the phase CoMo or NiMo is used.

These guard catalysts or guard beds can exhibit macroporosity. The guard beds can be those marketed by Norton-Saint-Gobain, for example the MacroTrap® guard beds. The guard beds can be those marketed by Axens in the ACT family: ACT077, ACT645, ACT961 or HMC841, HMC845, HMC868 or HMC945. It can be particularly advantageous to superpose these catalysts in at least two different beds of varying heights. The catalysts with the highest voidage are preferably used in the first catalytic bed or beds at the catalytic reactor inlet. It can also be advantageous to use at least two different reactors for these catalysts.

EMBODIMENTS

The hydrocracking process according to the invention employing the catalyst described above covers ranges of pressure and of conversion ranging from mild hydrocracking to high-pressure hydrocracking. Mild hydrocracking means hydrocracking that leads to moderate conversions, generally below 40%, and operating at low pressure, generally between 2 MPa and 6 MPa.

The hydrocracking process according to the invention is carried out in the presence of at least one hydrocracking catalyst according to the invention. The hydrocracking process according to the invention can advantageously be performed in one or two step(s), independently of the pressure at which said process is carried out. It is carried out in the presence of one or more hydrocracking catalyst(s) obtained according to the invention, in one or more reaction unit(s) equipped with one or more reactor(s).

The hydrocracking process according to the invention can advantageously employ said catalyst described above alone, in one or several fixed-bed catalyst beds, in one or more reactors, in a known single-step hydrocracking scheme, with or without liquid recycling of the unconverted fraction, optionally in conjunction with a conventional hydrotreating catalyst located upstream of the catalyst used in the process according to the present invention.

The hydrocracking process according to the invention can advantageously also employ said catalyst described above alone, in one or several ebullating bed reactors, in a known single-step hydrocracking scheme, with or without liquid recycling of the unconverted fraction, optionally in conjunction with a conventional hydrotreating catalyst located in a fixed bed or ebullating bed reactor upstream of the catalyst used in the process according to the present invention.

The ebullating bed operates with withdrawal of spent catalyst and daily addition of fresh catalyst in order to maintain stable catalyst activity.

The catalyst described according to the invention can also advantageously be used in the first hydrotreating reaction zone, in converting pretreatment, alone or in conjunction with another conventional hydrorefining catalyst, located upstream of the catalyst described according to the invention, in one or more catalyst bed(s), in one or more fixed bed or ebullating bed reactor(s).

Known Single-Step Process

The hydrocracking process according to the invention can advantageously be carried out in a known single-step process.

Known single-step hydrocracking comprises firstly and generally a thorough hydrorefining for the purpose of hydrodenitrogenation and a thorough desulphurization of the feed before the latter is sent to the hydrocracking catalyst proper, in particular in the case when the latter comprises a zeolite. This thorough hydrorefining of the feed only leads to limited conversion of the feed, to lighter fractions, which is still insufficient and must therefore be completed on the more active hydrocracking catalyst described above. However, it should be noted that no separation is involved between the two types of catalysts. The whole of the effluent leaving the reactor is injected onto said hydrocracking catalyst proper and it is only afterwards that separation of the products formed takes place. This version of hydrocracking, also called "once-through", has a variant that includes recycling of the unconverted fraction to the reactor for more thorough conversion of the feed.

The catalyst described according to the invention is therefore advantageously employed in a known single-step hydrocracking process, in a hydrocracking zone positioned downstream of a hydrorefining zone, without employing any intermediate separation between the two zones.

Preferably, the hydrorefining catalyst used in the first hydrorefining reaction zone, alone or in conjunction with another conventional hydrorefining catalyst, located upstream of the catalyst described according to the invention, is a catalyst optionally comprising a doping element selected from phosphorus, boron and silicon, said catalyst being based on group VIII base elements and optionally in combination with group VIB elements on an alumina or silica-alumina support and even more preferably said catalyst comprises nickel and tungsten.

The catalyst described according to the invention can also advantageously be used in the first hydrorefining reaction zone, in converting pretreatment, alone or in conjunction with another conventional hydrorefining catalyst, located upstream of the catalyst described according to the invention, in one or more catalyst bed(s), in one or more reactor(s).

Known Single-Step Fixed Bed Process with Intermediate Separation

The hydrocracking process according to the invention can advantageously be carried out in a known single-step fixed bed process with intermediate separation.

Said process advantageously comprises a hydrorefining zone, a zone for partial removal of ammonia, for example by hot flash, and a zone comprising said hydrocracking catalyst according to the invention. This one-step process for hydrocracking of hydrocarbon feeds for production of middle distillates and optionally of oil bases advantageously comprises at least one first hydrorefining reaction zone, and at least one second reaction zone, in which hydrocracking of at least a proportion of the effluent from the first reaction zone is carried out. This process also advantageously comprises incomplete separation of ammonia from the effluent leaving the first zone. This separation is advantageously carried out by means of an intermediate hot flash. The hydrocracking applied in the second reaction zone is advantageously carried out in the presence of ammonia in an amount less than the amount present in the feed, preferably below 1500 ppm by weight, more preferably below 1000 ppm by weight and even more preferably below 800 ppm by weight of nitrogen.

The catalyst described according to the invention is therefore employed advantageously in a known single-step fixed bed hydrocracking process with intermediate separation, in a hydrocracking zone positioned downstream of a hydrorefining zone, an intermediate separation for partial removal of ammonia being applied between the two zones.

Preferably, the hydrorefining catalyst used in the first hydrorefining reaction zone, alone or in conjunction with another conventional hydrorefining catalyst, located upstream of the catalyst described according to the invention, is a catalyst optionally comprising a doping element selected from phosphorus, boron and silicon, said catalyst being based on group VIII base elements and optionally in combination with group VIB elements on an alumina or silica-alumina support and even more preferably said catalyst comprises nickel and tungsten.

The catalyst described according to the invention can also advantageously be used in the first hydrorefining reaction zone, in converting pretreatment, alone or in conjunction with another conventional hydrorefining catalyst, located upstream of the catalyst described according to the invention, in one or more catalyst bed(s), in one or more reactor(s).

Known Two-Step Process

The hydrocracking process according to the invention can advantageously be applied in a known two-step process.

Two-step hydrocracking comprises a first step with the objective, as in the "one-step" process, of performing hydrorefining of the feed, but also of reaching a conversion of the latter generally of the order of 40 to 60%. The effluent from the first step then undergoes separation (distillation), which is generally called intermediate separation, for the purpose of separating the conversion products from the unconverted fraction. In the second step of a two-step hydrocracking process, only the fraction of the feed not converted in the first step is treated. This separation enables a two-step hydrocracking process to be more selective for middle distillates (kerosene+diesel) than a single-step process. In fact, intermediate separation of the conversion products avoids their "overcracking" to naphtha and gas in the second step on the hydrocracking catalyst. Moreover, it should be noted that the unconverted fraction of the feed treated in the second step generally has very low contents of $NH_3$ as well as of organic nitrogen compounds, generally less than 20 ppm by weight or even less than 10 ppm by weight.

The configurations of fixed-bed or ebullating-bed catalyst beds described in the case of a known single-step process can advantageously be used in the first step of a known two-step scheme, whether the catalyst according to the invention is used alone or in conjunction with a conventional hydrorefining catalyst.

The catalyst described according to the invention is therefore advantageously employed in a known two-step hydrocracking process, in the second step of hydrocracking positioned downstream of the first step of hydrorefining, an intermediate separation being applied between the two zones.

For the known single-step processes and for the first hydrorefining step of known two-step hydrocracking processes, the conventional hydrorefining catalysts that can advantageously be used are the catalysts optionally comprising a doping element selected from phosphorus, boron and silicon, said catalyst being based on group VIII base elements and optionally in combination with group VIB elements on an alumina or silica-alumina support and even more preferably said catalyst comprises nickel and tungsten.

According to a first embodiment of the hydrocracking process according to the invention, the hydrocracking catalyst(s) positioned in the hydrocracking process obtained is(are) advantageously used alone or sequentially, in one or more fixed-bed or ebullating-bed catalyst beds, in one or more reactors, in a known "one-step" hydrocracking scheme, with or without liquid recycling of the unconverted fraction, optionally in conjunction with a hydrorefining catalyst located upstream of the hydrocracking catalyst or catalysts. The ebullating bed operates with withdrawal of spent catalyst and daily addition of fresh catalyst in order to maintain stable catalyst activity.

According to a second embodiment of the hydrocracking process according to the invention, the hydrocracking catalyst(s) of the hydrocracking process according to the invention is(are) advantageously used, alone or sequentially, in one or in several catalyst beds, in the one and/or other step of a known "two-step" hydrocracking scheme. The "two-step" scheme is a scheme for which there is intermediate separation of the effluents between the two reaction zones. This scheme can be carried out with or without liquid recycling of the unconverted fraction from the first reaction zone or from the second reaction zone. The first reaction zone operates with fixed bed or ebullating bed. In the particular case where the hydrocracking catalyst or catalysts obtained according to the invention are placed in the first reaction zone, they would preferably be placed in conjunction with a hydrorefining catalyst located upstream of said catalysts.

The following examples illustrate the present invention but without limiting its scope.

Example 1: Preparation of a Support S1 Containing a Zeolite NU-86, a Zeolite Y and a Porous Matrix of the Silica-Alumina Type and the Corresponding Catalyst C1 (According to the Invention)

One of the raw materials used is a zeolite NU-86, which is prepared according to example 2 of patent EP 0 463768 A2 and has a Si/Al overall atomic ratio equal to 11 and a Na/Al atomic ratio equal to 0.25. Another raw material used is zeolite Y in protonated form (H+) of the type CBV 720 from zéolyst (Table 1).

TABLE 1

Description of zeolite Y

| zeolite | Ratio $SiO_2/Al_2O_3$ | Cationic form | Lattice parameter (Å) | Surface area ($m^2/g$) |
|---|---|---|---|---|
| CBV720 | 30 | H+ | 24.28 | 780 |

Zeolite NU-86, crude from synthesis, firstly undergoes a known dry calcining at 550° C. under a stream of dry air for 9 hours. Then the solid obtained is submitted to four ion exchanges in a 10N solution of $NH_4NO_3$, at about 100° C. for 4 hours for each exchange. The solid thus obtained is designated $NH_4$—NU-86/1 and has a Si/Al ratio=11 and a Na/Al ratio=0.0012. Its other physicochemical characteristics are presented in Table 2.

TABLE 2

Description of zeolite NU-86

| Sample | X-ray diffraction crystallinity (%) | $^SBET$ ($m^2/g$) | Adsorption $V(P/P_O = 0.19)$ ml $N_2$ liquid/g |
|---|---|---|---|
| $NH_4$-NU-86/1 | 100 | 433 | 0.159 |

The crystallites of zeolite NU-86 are in the form of crystals ranging in size from 0.4 μm to 2 μm. The hydrocracking catalyst is prepared using 2 wt % of the aforementioned zeolite NU-86, which is mixed with 5.6 wt % of a zeolite Y CBV 720 mentioned above and with 92.4 wt % of a silica-alumina containing 30 wt % of $SiO_2$ and 70 wt % of $Al_2O_3$. The mixed paste is then extruded through a die with a diameter of 1.8 mm. The extrudates are then dried overnight at 120° C. in air and then calcined at 550° C. in air. The extrudates then undergo a treatment under steam at 750° C. for 2 h.

The support extrudates containing zeolite NU-86 and zeolite Y described above are impregnated dry with an aqueous solution containing ammonium metatungstate and nickel nitrate. They are dried overnight at 120° C. in air and finally calcined in air at 450° C. for 2 h. The contents by weight of oxides of catalyst C1 are 3 wt % for Ni (expressed in the form of NiO) and 28 wt % for W (expressed in the form of $WO_3$).

Example 2: Preparation of a Support S2 Containing a Zeolite NU-86 and a Porous Matrix of the Silica-Alumina Type and the Corresponding Catalyst C2 (not According to the Invention)

The same zeolite NU-86 as in example 1 was used for preparing the support S2 and the catalyst C2. The support of the hydrocracking catalyst is prepared using 7.6 wt % of the aforementioned zeolite NU-86, which is mixed with 92.4 wt % of a silica-alumina containing 30 wt % of $SiO_2$ and 70 wt % of $Al_2O_3$. The mixed paste is then extruded through a die with a diameter of 1.8 mm. The extrudates are then dried overnight at 120° C. in air and then calcined at 550° C. in air. The extrudates then undergo a treatment under steam at 750° C. for 2 h.

The support extrudates containing zeolite NU-86 are impregnated dry with an aqueous solution containing ammonium metatungstate and nickel nitrate. They are dried overnight at 120° C. in air and finally calcined in air at 450° C. for 2 h. The contents by weight of oxides of catalyst C2 are 2.9 wt % for Ni (expressed in the form of NiO) and 28.5 wt % for W (expressed in the form of $WO_3$).

Example 3: Preparation of a Support S3 Containing a Zeolite Y and a Porous Matrix of the Silica-Alumina Type and the Corresponding Catalyst C3 (not According to the Invention)

The same zeolite Y as in example 1 was used for preparing the support S3 and the catalyst C3. The support of the hydrocracking catalyst is prepared using 7.6 wt % of the aforementioned zeolite Y, which is mixed with 92.4 wt % of a silica-alumina containing 30 wt % of $SiO_2$ and 70 wt % of $Al_2O_3$. The mixed paste is then extruded through a die with a diameter of 1.8 mm. The extrudates are then dried overnight at 120° C. in air and then calcined at 550° C. in air. The extrudates then undergo a treatment under steam at 750° C. for 2 h.

The support extrudates containing zeolite Y are impregnated dry with an aqueous solution containing ammonium metatungstate and nickel nitrate. They are dried overnight at 120° C. in air and finally calcined in air at 450° C. for 2 h. The contents by weight of oxides of catalyst C3 are 3.1 wt % for Ni (expressed in the form of NiO) and 28.3 wt % for W (expressed in the form of $WO_3$).

Example 4: Preparation of a Support S4 Containing a Zeolite Y, a Zeolite Beta and a Porous Matrix of the Silica-Alumina Type and the Corresponding Catalyst C4 (not According to the Invention The same zeolite Y as in example 1 was used for preparing the support S4 and the catalyst C4. The zeolite beta used for preparing the support S4 and the catalyst C4 is described in Table 3.

TABLE 3

Description of zeolite beta

| zeolite | Ratio $SiO_2/Al_2O_3$ | Cationic form | Lattice parameter (Å) | Surface area (m²/g) |
| --- | --- | --- | --- | --- |
| beta | 25 | H⁺ | 26.2 | 680 |

The support of the hydrocracking catalyst is prepared using 5.6 wt % of zeolite Y mentioned above, which is mixed with 2 wt % of zeolite beta mentioned above and with 92.4 wt % of a silica-alumina containing 30 wt % of $SiO_2$ and 70 wt % of $Al_2O_3$. The mixed paste is then extruded through a die with a diameter of 1.8 mm. The extrudates are then dried overnight at 120° C. in air and then calcined at 550° C. in air. The extrudates then undergo a treatment under steam at 750° C. for 2 h.

The support extrudates containing zeolite Y and zeolite beta are impregnated dry with an aqueous solution containing ammonium metatungstate and nickel nitrate. They are dried overnight at 120° C. in air and finally calcined in air at 450° C. for 2 h. The contents by weight of oxides of catalyst C4 are 3.1 wt % for Ni (expressed in the form of NiO) and 28.7 wt % for W (expressed in the form of $WO_3$).

Example 5: Preparation of a Support S5 Containing a Zeolite NU-86, a Zeolite Y and a Porous Matrix of the Alumina Type and the Corresponding Catalyst C5 (According to the Invention)

The same zeolite NU-86 in protonated form as in example 1 was used for preparing the support S5 and the catalyst C5. Another raw material used for preparing the support S5 is zeolite Y in protonated form (H+) described in Table 4.

TABLE 4

Description of zeolite Y

| zeolite | Ratio $SiO_2/Al_2O_3$ | Cationic form | Lattice parameter (Å) | Surface area (m²/g) |
| --- | --- | --- | --- | --- |
| USY | 12 | H⁺ | 24.35 | 730 |

The support of the hydrocracking catalyst is prepared using 5 wt % of the aforementioned zeolite NU-86, which is mixed with 18 wt % of a zeolite Y mentioned above and with 77 wt % of an alumina gel. The mixed paste is then extruded through a die with a diameter of 1.8 mm. The extrudates are then dried overnight at 120° C. in air and then calcined at 550° C. in air.

The support extrudates containing zeolite NU-86, zeolite Y and aluminic matrix are impregnated dry with an aqueous solution, in which $Ni(OH)_2$, $MoO_3$ and $H_3PO_4$ were dissolved beforehand. They are dried overnight at 120° C. in air and calcined at 350° C. The formulation NiMoP of catalyst C5 is 2.7-23-4.9 wt % relative to the dry weight of catalyst respectively for Ni (expressed in the form of NiO), for Mo (expressed in the form of $MoO_3$) and for P (expressed in the form of $P_2O_5$).

Example 6: Preparation of a Support S6 Containing a Zeolite NU-86 and a Porous Matrix of the Alumina Type and the Corresponding Catalyst C6 (not According to the Invention)

The same zeolite NU-86 in protonated form as in example 1 was used for preparing the support S6 and the catalyst C6.

The support of the hydrocracking catalyst is prepared using 23 wt % of the aforementioned zeolite NU-86, which is mixed with 77 wt % of an alumina gel. The mixed paste is then extruded through a die with a diameter of 1.8 mm. The extrudates are then dried overnight at 120° C. in air and then calcined at 550° C. in air.

The support extrudates containing zeolite NU-86 and alumina are impregnated dry with an aqueous solution, in which $Ni(OH)_2$, $MoO_3$ and $H_3PO_4$ were dissolved beforehand. They are dried overnight at 120° C. in air and calcined at 350° C. The formulation NiMoP of catalyst C6 is 2.6-23.2-4.7 wt % relative to the dry weight of catalyst respectively for Ni (expressed in the form of NiO), for Mo (expressed in the form of $MoO_3$) and for P (expressed in the form of $P_2O_5$).

Example 7: Preparation of a Support S7 Containing a Zeolite Y and a Porous Matrix of the Alumina Type and the Corresponding Catalyst C7 (not According to the Invention)

The zeolite Y of example 7 is the same as that used in example 5.

The support of the hydrocracking catalyst is prepared using 23 wt % of zeolite Y mentioned above, which is mixed with 77 wt % of an alumina gel. The mixed paste is then extruded through a die with a diameter of 1.8 mm. The extrudates are then dried overnight at 120° C. in air and then calcined at 550° C. in air.

The support extrudates are impregnated dry with an aqueous solution, in which $Ni(OH)_2$, $MoO_3$ and $H_3PO_4$ were dissolved beforehand. They are dried overnight at 120° C. in air and calcined at 350° C. The formulation NiMoP of catalyst C7 is 2.6-23.1-4.8 wt % relative to the dry weight of catalyst respectively for Ni (expressed in the form of NiO), for Mo (expressed in the form of $MoO_3$) and for P (expressed in the form of $P_2O_5$).

Example 8: Preparation of a Support S8 Containing a Zeolite Y, a Zeolite Beta and a Porous Matrix of the Alumina Type and the Corresponding Catalyst C8 (not According to the Invention)

The zeolite Y used in example 8 is the same as that used in example 5. The zeolite beta used in example 8 is the same as that used in example 4.

The support of the hydrocracking catalyst is prepared using 18 wt % of zeolite Y, which is mixed with 5 wt % of zeolite beta and with 77 wt % of an alumina gel. The mixed paste is then extruded through a die with a diameter of 1.8 mm. The extrudates are then dried overnight at 120° C. in air and then calcined at 550° C. in air.

The support extrudates thus prepared are impregnated dry with an aqueous solution, in which $Ni(OH)_2$, $MoO_3$ and $H_3PO_4$ were dissolved beforehand. They are dried overnight at 120° C. in air and calcined at 350° C. The formulation NiMoP of catalyst C8 is 2.7-23.2-5 wt % relative to the dry weight of catalyst respectively for Ni (expressed in the form of NiO), for Mo (expressed in the form of $MoO_3$) and for P (expressed in the form of $P_2O_5$).

Example 9: Evaluation of Catalysts C1, C2, C3 and C4 in High-Pressure Hydrocracking of a Vacuum Distillate The catalysts C1, C2, C3 and C4 whose preparation is described in examples 1, 2, 3 and 4 are used for carrying out hydrocracking of a partially hydrotreated vacuum distillate with the main characteristics shown in Table 5.

TABLE 5

| Characteristics of the partially hydrotreated vacuum distillate | |
|---|---|
| Density at 15° C. | 0.9051 |
| Sulphur (wt %) | 0.24 |
| Nitrogen (ppm by weight) | 301 |

The catalysts C1, C2, C3 and C4 were employed according to the process of the invention using a pilot unit having 1 traversed fixed bed reactor, with the fluids circulating from top to bottom (down-flow).

Before the hydrocracking test, the catalysts are sulphurised at 14 MPa, at 350° C. by means of a direct-distillation gas oil with addition of 2 wt % of DMDS (dimethyl disulphide).

After sulphurization, catalytic tests were carried out in the following conditions:
Total pressure: 14 MPa,
Hydrogen flow rate: 1000 liters of gaseous hydrogen per liter of feed injected,
Space velocity (LHSV) is equal to 0.66 $h^{-1}$,
The temperature applied is that for which 80% of crude conversion is obtained.

DMDS and aniline are added to the feed in order to maintain the $H_2S$ and $NH_3$ partial pressures during the test that would have been generated by previous hydrotreating of the crude, non-hydrotreated feed.

The catalytic performance is expressed in terms of crude conversion of the 370+ cut (molecules whose boiling point is above 370° C.) to the 370− cut (molecules whose boiling point is below 370° C.) and of crude selectivity for middle distillates (150-370° C. cut). The conversion and selectivity are expressed on the basis of the results of simulated distillation and analyses of the gases by gas chromatography.

The crude conversion to products having a boiling point below 370° C., designated as CB 370° C., is taken as equal to the percentage by weight of molecules whose boiling point is below 370° C. in the effluents CB 370° C.=% of 370° $C.^{-}_{effluents}$ The crude selectivity for middle distillates (cut whose boiling points are between 150 and 370° C.) is designated as SB MD and is taken as equal to:

SB MD=[(fraction of 150-370$_{effluents}$)]/[(% of 370° $C.^{-}_{effluents}$)].

The catalytic performance obtained is shown in Table 6 below.

TABLE 6

Catalytic results for catalysts C1, C2, C3 and C4 in high-pressure hydrocracking

| Catalyst | Composition of the support | Temperature for maintaining CB 370° C. = 80% | SB MD in % |
|---|---|---|---|
| C1 (according to the invention) | (SiAl + 5.6% Y + 2% NU-86) | 396° C. | 72 |
| C2 (not according to the invention) | (SiAl + 7.6% NU-86) | 395° C. | 64 |
| C3 (not according to the invention) | (SiAl + 7.6% Y) | 401° C. | 68 |
| C4 (not according to the invention) | (SiAl + 5.6% Y + 2% beta) | 397.5° C. | 70 |

The results show that the particular combination of zeolite NU-86 with zeolite Y in catalyst C1 makes it possible to generate a catalyst that is very active and highly selective for middle distillates. The presence of zeolite NU-86 only (in the case of catalyst C2 not according to the invention) makes it possible to obtain a catalyst that is very active but has extremely low selectivity for middle distillates. The addition of NU-86 in a catalyst containing zeolite Y makes it possible to increase the conversion significantly (comparison of catalysts C1 (according to the invention) and C3 (not according to the invention)) and the particular combination of the 2 zeolites makes it possible, surprisingly, to increase the selectivity for middle distillates significantly, compared to the other systems that only contain a single type of zeolite or a mixture of zeolite Y and zeolite beta (comparison of catalysts C1 (according to the invention) and C4 (not according to the invention)).

Example 10: Evaluation of Catalysts C5, C6, C7 and C8 in High-Pressure Hydrocracking of a Vacuum Distillate The catalysts C5, C6, C7 and C8 whose preparation is described in examples 5, 6, 7 and 8 are used for carrying out hydrocracking of a hydrotreated vacuum distillate with the main characteristics shown in Table 7.

TABLE 7

Characteristics of the hydrotreated vacuum distillate

| | |
|---|---|
| Density at 15° C. | 0.8659 |
| Sulphur (ppm by weight) | 54 |
| Nitrogen (ppm by weight) | 14 |

The catalysts C5, C6, C7 and C8 were employed according to the process of the invention using a pilot unit having 1 traversed fixed bed reactor, with the fluids circulating from top to bottom (down-flow).

Before the hydrocracking test, the catalysts are sulphurised at 14 MPa, at 350° C. by means of a direct-distillation gas oil with addition of 2 wt % of DMDS (dimethyl disulphide).

After sulphurization, catalytic tests were carried out in the following conditions:

Total pressure: 14 MPa,
Hydrogen flow rate: 1000 liters of gaseous hydrogen per liter of feed injected,
Space velocity (LHSV) is equal to 1 $h^{-1}$,
The temperature applied is that for which 70% of crude conversion is obtained.

DMDS and aniline are added to the feed in order to maintain the partial pressures of $H_2S$ and $NH_3$ during the test, that would have been generated by previous hydrotreating of the crude, non-hydrotreated feed.

The catalytic performance is expressed in terms of crude conversion of the 370+ cut (molecules whose boiling point is above 370° C.) to the 370− cut (molecules whose boiling point is below 370° C.) and of the yield of middle distillates (MD, 150-370° C. cut). The conversion and the yield of MD are expressed on the basis of the results of simulated distillation and analyses of the gases by gas chromatography.

The crude conversion to products having a boiling point below 370° C., designated as CB 370° C., is taken as equal to the percentage by weight of molecules whose boiling point is below 370° C. in effluents CB 370° C.=% of 370° $C._{effluents}^-$ The yield of middle distillates (cut whose boiling points are between 150 and 370° C.) is taken as equal to:

Yield of MD=% of molecules whose boiling points are between 150° C. and 370° C. in the effluents.

The catalytic performance obtained is shown in Table 8 below.

TABLE 8

Catalytic results for C5, C6, C7 and C8 in high-pressure hydrocracking

| Catalyst | Composition of the support | Temperature for maintaining CB 370° C. = 80% | Yield of MD in % |
|---|---|---|---|
| C5 (according to the invention) | (alumina + 18% Y + 5% NU-86) | 368.5 | 55.4 |
| C6 (not according to the invention) | (alumina + 23% NU-86) | 367.5 | 49.7 |
| C7 (not according to the invention) | (alumina + 23% Y) | 370 | 52.6 |
| C8 (not according to the invention) | (alumina + 18% Y + 5% beta) | 369 | 54 |

The results show that the particular combination of zeolite NU-86 with zeolite Y in catalyst C5 makes it possible to generate a catalyst that is very active and highly selective for middle distillates. The presence of zeolite NU-86 only (in the case of catalyst C6 not according to the invention) makes it possible to obtain a catalyst that is very active but has extremely low selectivity for middle distillates. The addition of NU-86 in a catalyst containing zeolite Y makes it possible to increase the conversion significantly (comparison of catalysts C5 (according to the invention) and C7 (not according to the invention)) and the particular combination of 2 zeolites makes it possible, surprisingly, to increase the selectivity for middle distillates significantly, compared to the other systems that only contain a single type of zeolite or a mixture of zeolite Y and zeolite beta (comparison of catalysts C5 (according to the invention) and C8 (not according to the invention)).

The invention claimed is:

1. A catalyst comprising at least one metal of group VIB or of group VIII of the periodic table, used alone or as a mixture, and a support comprising at least one zeolite NU-86, at least one zeolite Y and at least one porous mineral matrix containing at least aluminium and/or at least silicon, said catalyst comprising, in wt % relative to the total weight of the catalyst:

0.2 to 10%, of at least one zeolite NU-86,
0.4 to 40%, of at least one zeolite Y, from 0.5 to 50% of at least one hydrogenating-dehydrogenating metal of group VIB or of group VIII,
1 to 99% of at least one porous mineral matrix comprising at least aluminium and/or at least silicon.

2. The catalyst according to claim 1 in which said zeolite Y is a dealuminized USY zeolite.

3. The catalyst according to claim 1 in which said porous mineral matrix is an alumina, doped alumina, silicalite, silica, aluminosilicate or a non-zeolitic crystalline molecular sieve, alone or as a mixture.

4. The catalyst according to claim 3 in which said porous mineral matrix is transition alumina or silica-alumina.

5. The catalyst according to claim 1 in which said catalyst comprises at least one hydrogenating-dehydrogenating metal of group VIB in combination with at least one group VIII base metal.

6. The catalyst according to claim 5 in which the content of group VIB metal, in oxide equivalent, is between 5 and 40 wt % relative to the total weight of said catalyst, and the content of group VIII base metal, in oxide equivalent, is between 0.5 and 10 wt % relative to the total weight of said catalyst.

7. A process for hydrocracking of hydrocarbon feeds, comprising contacting a hydrocarbon feed with the catalyst according to claim 1, in the presence of hydrogen, at a temperature above 200° C., at a pressure above 1 MPa, at a space velocity between 0.1 and 20 h−1 and with an amount of hydrogen introduced such that the volume ratio liter of hydrogen/liter of hydrocarbon is between 80 and 5000 L/L.

8. The process according to claim 7 in which said process is carried out at a temperature between 250 and 480° C., at a pressure between 2 and 25 MPa, at a space velocity between 0.1 and 6 h−1, and with an amount of hydrogen introduced such that the volume ratio liter of hydrogen/liter of hydrocarbon is between 100 and 2000 L/L.

9. The process according to claim 7 in which said hydrocarbon feed is at least one light gas oil from a catalytic cracking unit, atmospheric distillate, vacuum distillate, feed from units for extraction of aromatics from lubricant oil bases or from solvent dewaxing of lubricant oil bases, distillate from fixed bed or ebullating bed processes for desulphurization or hydroconversion of atmospheric residues and/or of vacuum residues and/or of deasphalted oils, paraffin from the Fischer-Tropsch process or deasphalted oil, used alone or as a mixture.

10. The process according to claim 7 in which said process is applied in a known single-step process.

11. The process according to claim 10 in which said catalyst is employed in a hydrocracking zone positioned downstream of a hydrorefining zone, without employing any intermediate separation between the two zones.

12. The process according to claim 7 in which said process is applied in a known two-step process.

13. The process according to claim 12 in which said catalyst is employed in the second step of hydrocracking positioned downstream of the first step of hydrorefining, an intermediate separation being applied between the two zones.

* * * * *